July 4, 1950 E. P. FRANK 2,513,856
ENGINE
Filed Dec. 11, 1946 2 Sheets-Sheet 1
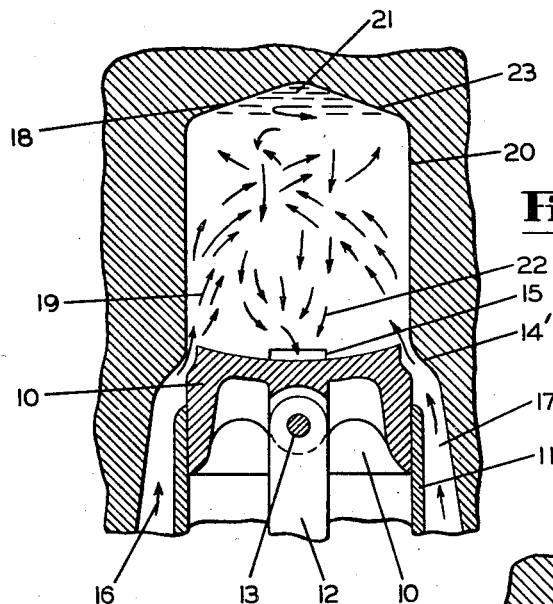
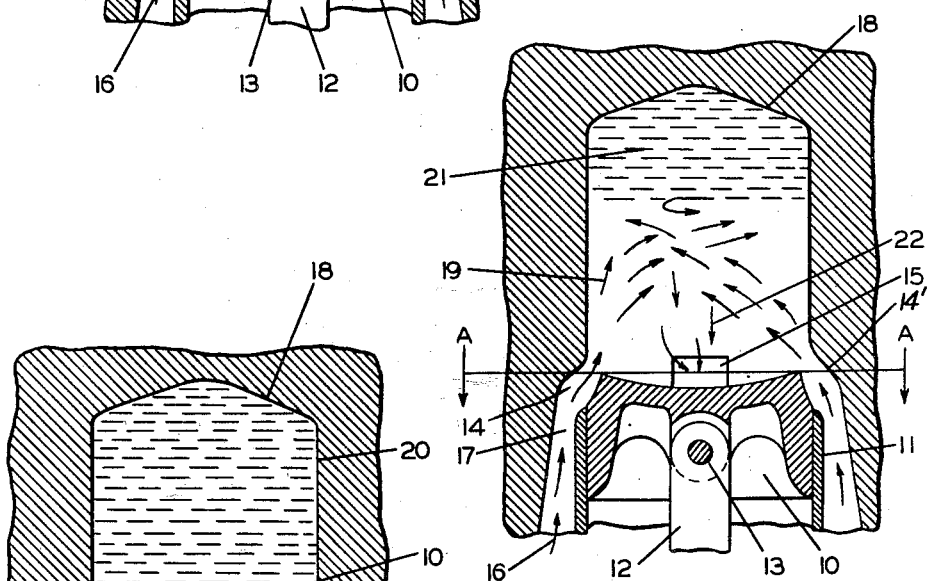
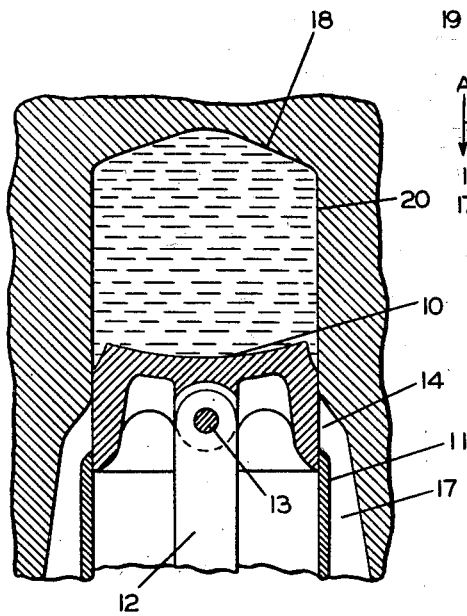
INVENTOR.
EUGENE P. FRANK
BY
Christian R. Nielsen
ATTORNEY.

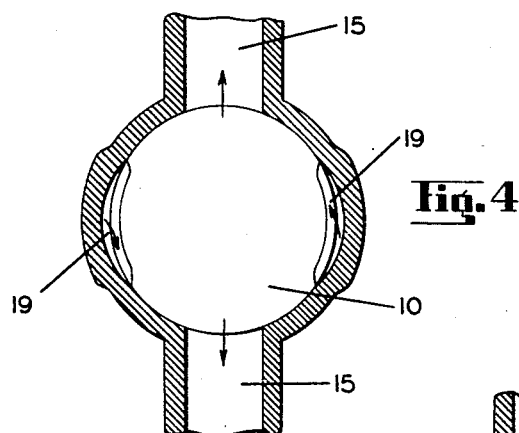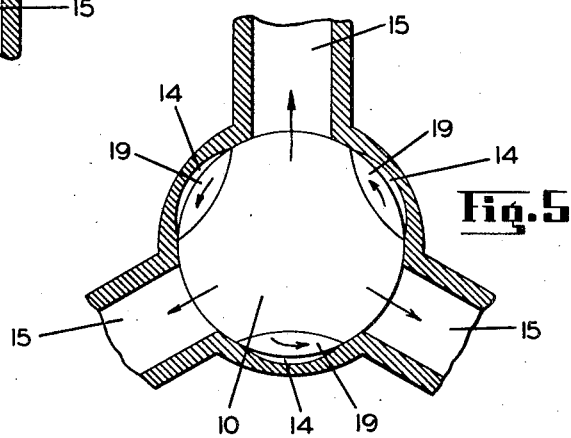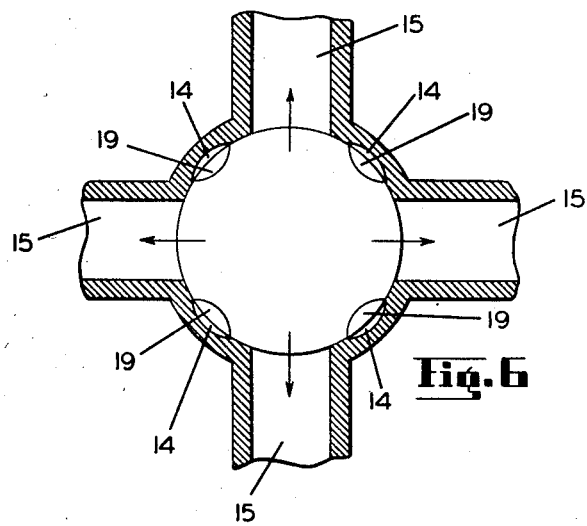

Patented July 4, 1950

2,513,856

UNITED STATES PATENT OFFICE 2,513,856

ENGINE

Eugene P. Frank, Milwaukee, Wis.

Application December 11, 1946, Serial No. 715,431

3 Claims. (Cl. 123—65)

My invention relates to two cycle engines and more particularly to a method of charging an internal combustion engine requiring two strokes to complete the cycle.

An object of my invention is to provide a means of improving the efficiency and utility of an internal combustion engine, by providing an improved method of exhausting, scavenging and charging the compression cylinders, and eliminating the functional detriments encountered in devices thus far revealed in the prior art.

It is manifest to anyone familiar with port control, two cycle, internal combustion engines that are at present on the market, that the scavenging process is not adequate and efficient for removing the combustion residue, thereby inducing uncontrolled dilution of combustible mixtures and promoting the limited function oft times observed, especially in high speed applications. This greatly offsets the desirable features of economy and simplicity inherent in the cycle.

My invention has for its purpose to establish the phase condition within the cylinder of the engine, whereby the charging medium forms a gaseous phase of high density relative to the cylinder contents and possesses integral motion that contributes to a desirable combustion characteristic. In my construction the waste contents of the cylinder is displaced integrally by the volume increase of the charging phase, and is not forced, driven or restricted in its movement by the flow of the charging agent. This feature is made possible by dividing the charging medium and accelerating it through apertures symmetrically positioned around the periphery of the cylinder axis, injecting the charging medium into the cylinder at a high velocity and directing it spirally along the cylinder wall into the combustion chamber, which is constructed in a manner to combine and impact the impinging streams of low frontal area, to a dense, rapidly swirling, integral gaseous phase which is caused to increase in volume with the scavenging movement of the piston.

Simultaneously, the waste contents of the cylinder is displaced and decreased in volume progressively, beginning in the cylinder area which is most remote from the exhaust outlet and proceeding in stable flow in the direction of their expansion movement to the plurality of exhaust outlets which are symmetrically positioned about the cylinder axis, thereby providing favorable conditions of discharge and heat stress.

Prior to entering the cylinder, the charging medium is accelerated through the charging members in a direction parallel to the cylinder axis, to the inlet apertures formed by the piston edge and cylinder wall. This inlet aperture is aerodynamically developed to direct the spirally disposed high velocity flow along the cylinder walls, thus localizing the charging action adjacent to the inner surface of the cylinder, and in this manner providing a maximum area for the expulsion of the exhaust gases with a minimum of obstruction to their flow.

Other and further objects of my invention will become more apparent as the description proceeds and when taken in conjunction with the drawings in which Figure 1 is a fragmentary cross-sectional view of the cylinder and piston arrangement, wherein the piston movement is opening the inlet apertures after uncovering the exhaust ports.

Figure 2 is a similar view shown in Figure 1, but showing the charging phase further developed and waste gases progressively reduced in volume.

Figure 3 is a similar view as shown in Figure 1, showing the piston movement closing the inlet apertures and exhaust ports and beginning the compression of the charged cylinder.

Figure 4 is a cross-sectional view of the cylinder taken at the line A—A in Figure 2, and showing the two inlet apertures and outlet ports oppositely disposed.

Figure 5 is a similar view as shown in Figure 4 showing three each, equally spaced inlet apertures and outlet ports, and Figure 6 is a similar view as shown in Figure 4, showing four each, equally spaced inlet apertures and outlet ports around the periphery of the piston.

Similar characters of reference indicate corresponding parts throughout the several views and referring now to the same, the character 10 shows a piston slidably mounted within the cylinder wall 11. Obviously, the piston may be of any conventional design and may be provided with piston rings in the conventional manner. The piston 10 is shown provided with a conventional piston rod 12 supported and hinged to the piston by means of a piston pin 13.

In Figure 1 the piston 10 is shown moving downward and opening the inlet apertures 14 after uncovering the exhaust ports 15 and reducing the cylinder pressure. The charging medium shown as 16 is accelerated axially through the charging tube 17 to the inlet apertures 14, injecting the charging medium 16 at high velocity against the cylinder wall, parallel to the cylinder axis and circumferentially inclined as shown at 14' in Figure 2, thereby causing the charging stream to conform and to flow spirally to the cylinder head 18 localizing the charging action 19 adjacent to the inner surface of the cylinder. The charging streams impinge onto the cylinder head surface 23, formed to converge and complement their relative motions, producing a dense rapidly swirling, gaseous phase 21, increasing in volume with the downward movement of the piston 10. The waste gases 22 are displaced in direction of expansion flow through exhaust ports 15.

In Figure 2 the charging phase 21 is further developed and the waste gases 22 are progressively reduced in volume, while in Figure 3 the movement of the piston 10 has closed the inlet apertures 14 and the exhaust port 15 and is beginning compression of the charged cylinder.

In the chosen embodiments of my invention exemplified by the accompanying drawing, there are present many features not heretofore shown or disclosed in the prior art which will be hereinafter more fully referred to and specifically pointed out in the appended claims.

Having thus described my invention, what I claim and desire to secure by Letters Patent in the United States is:

1. A two cycle internal combustion engine having a piston with a concave head operating in combination with a cylinder, said cylinder provided with a plurality of exhaust ports and a plurality of circumferentially inclined inlet apertures disposed radially to a vertical position, said inlet apertures and exhaust ports symmetrically spaced along the inner circumferential wall of said cylinder in a manner to place the inlet apertures between said exhaust ports, means for slidably actuating said piston within said cylinder thereby controlling the accelerated charge through said inlet apertures in a vertical spiral high velocity flow, along the cylinder wall toward the cylinder head due to their radial vertical contour, said cylinder head shaped to a contour to converge the impinging gas streams and complement the relative velocities to establish a dense gaseous phase within said cylinder head.

2. A two cycle internal combustion engine having a piston operating in combination with a cylinder, said cylinder provided with a plurality of exhaust ports and a plurality of radially disposed vertical inlet apertures, said inlet apertures and exhaust ports symmetrically spaced along the inner circumferential wall of said cylinder in a manner to alternately position the inlet apertures and exhaust ports, means for slidably actuating said piston within said cylinder, thereby controlling the accelerated charge through said inlet apertures in a vertical spiral high velocity manner along the cylinder wall toward the cylinder head due to the radial contour of said inlet apertures, said cylinder head being of a contour to cause the converging and impinging of the gas streams and complement their relative velocities to establish a dense gaseous phase within said cylinder head, said inlet apertures arranged in an inclined manner to cause a vertical spiral motion of said combustible gases entering said cylinder.

3. A two cycle internal combustion engine having a concave piston operating in combination with a cylinder, said cylinder provided with a plurality of exhaust ports and a plurality of inlet apertures radially disposed in a vertical plane, said inlet apertures and exhaust ports symmetrically spaced along the inner circumferential wall of said cylinder in a manner to place the inlet apertures and exhaust ports alternately, means for slidably actuating said piston within said cylinder, thereby controlling the accelerated charge through said inlet apertures in a vertically spiral high velocity flow, along the cylinder wall toward the cylinder head due to the radial contour of said inlet apertures, said cylinder head shaped to a contour to converge the impinging gas streams and complement their relative velocities and establish a dense gaseous phase within said cylinder, the concave contour of said piston head and inlet apertures providing a spiral motion of said combustible gaseous mixture when entering said cylinder, said piston acting as a charging member.

EUGENE P. FRANK.

REFERENCES CITED

The following references are of record in the file of this patent:

UNITED STATES PATENTS

| Number | Name | Date |
|---|---|---|
| 876,974 | Knox | Jan. 21, 1908 |
| 1,374,573 | Imhoff | Apr. 12, 1921 |
| 1,513,273 | Randerez | Oct. 28, 1924 |
| 1,744,446 | Chapman | Jan. 21, 1930 |
| 1,967,682 | Ochtman | July 24, 1934 |
| 2,119,121 | Steinlein | May 31, 1938 |

FOREIGN PATENTS

| Number | Country | Date |
|---|---|---|
| 226,269 | Germany | of 1910 |
| 219,031 | Great Britain | of 1925 |
| 117,037 | Australia | of 1942 |